United States Patent [19]

Newman

[11] 4,229,035
[45] Oct. 21, 1980

[54] VEHICLE WINDSHIELD RAIN DEFLECTOR SYSTEM

[76] Inventor: Joseph W. Newman, Rte. 1, Box 71-B, Lucedale, Miss. 39452

[21] Appl. No.: 869,795

[22] Filed: Jan. 16, 1978

[51] Int. Cl.² .............................................. B60J 1/20
[52] U.S. Cl. .................................... 296/95 R; 296/91
[58] Field of Search ................. 296/84 R, 84 C, 84 E, 296/91, 95 R, 96, 97 A, 1 S

[56] References Cited

U.S. PATENT DOCUMENTS

| 2,253,353 | 8/1941 | Sharp | 296/95 R |
| 2,528,903 | 11/1950 | Nichols | 296/95 R |
| 2,570,399 | 10/1951 | Smith | 296/95 R |
| 3,297,356 | 1/1967 | Francis | 296/95 R |
| 3,379,467 | 4/1968 | Brush | 296/95 R |

FOREIGN PATENT DOCUMENTS

| 534204 | 12/1956 | Canada | 296/91 |
| 553942 | 1/1957 | Italy | 296/91 |
| 138430 | 12/1952 | Sweden | 296/97 A |

*Primary Examiner*—David M. Mitchell
*Attorney, Agent, or Firm*—C. Emmett Pugh & Associates

[57] ABSTRACT

An automobile windshield rain deflector which functions as a result of a mathematical relationship between rain deflector, forward velocity of vehicle windshield and downward velocity of rain drops; and comprises a shield arranged above the driver's line of vision and is positioned substantially in front of the windshield, with a substantial gap between the deflector shield and the windshield. The shield is connected to a support means for movement between an inoperative orientation to an operative orientation by which a substantially rain free clear vision zone is provided on the windshield. In addition, the support means is movable relative to the windshield to adjust the position of the shield in its operative orientation so that the substantially rain free clear vision zone always coincides with the driver's line of vision regardless of the vehicle's speed or rainfall quantity.

19 Claims, 7 Drawing Figures

VEHICLE WINDSHIELD RAIN DEFLECTOR SYSTEM

BACKGROUND OF THE INVENTION

1. Field of the Invention

The present invention relates generally to devices for deflecting rain from the windshield of a moving vehicle and, more particularly, to such devices for use with an automobile.

2. Description of the Prior Art

The problem of removing rain from an automobile windshield to permit its safe operation in inclement weather has presented itself ever since the automobile was first invented. Although reciprocating windshield wipers have almost universally been used to solve this problem, they are far from a perfect solution. For example, the conventional wipers in use today only remove the rain from the windshield of a moving vehicle after the rain has been struck by the windshield, and they are not effective in preventing the rain from being struck by the windshield in the first place. As a result of rain drops splattering when being struck by the windshield of a moving vehicle, the driver's line of sight is greatly distorted and reduced, and during hard rains, is almost totally obscured causing many drivers to stop, and in addition causing many vehicle accidents. Consequently, any device which could provide a clearer vision zone on a vehicle windshield during a rainstorm would greatly increase driving safety and convenience.

Many devices have been proposed over the years to prevent rain from initially impinging on the windshield of a moving automobile. However, no previous devices disclosed or understood that for an invention to efficiently keep rain drops off the windshield of a vehicle at high speeds, the invention must function as a result of a mathematical relationship between rain shield, forward velocity of vehicle windshield and downward velocity of rain drops. It must also protect from potentially strong air pressure as a result of high speeds. For example, U.S. Pat. No. 1,126,754 to Griefen discloses an adjustable storm shield which is movable between an inoperative position above the windshield and an operative position angularly oriented relative to and placed in front of the windshield to prevent snow or rain from impinging on the windshield. Similarly, U.S. Pat. No. 1,645,416 to Collier discloses a pivotal sunshade which also functions as a storm shield when in an operative position. Also similar is U.S. Pat. No. 1,416,112 to Miles which discloses a rain shield that swings up and out and down and attempts to deflect the rain and air flow downward.

The storm shields disclosed in Griefen, Collier and Miles, supra, have a fixed longitudinal position relative to the windshield when the storm shield is in its operative rain deflecting position. Also the storm shields, shield 12 of Griefen, canopy and shield 3 and 6 of Collier, shields 5 and deflector 7 of Miles have no empty space between windshield and storm shield for relief of air compression stress; nor the shields extend a substantial or variable distance in front of their windshields to account for the mathematical relationship between rainshield, speed of falling rain drops, relative to forward speed of vehicle's windshield. Although such storm shields might function adequately at certain low vehicle speeds or rainfall quantities, they will not keep rain off the windshield when the speed of the vehicle increases substantially or when the rainfall quantity with high winds exceeds predetermined minimums. In addition, the storm shields of Griefen, Collier and Miles are generally mounted on the vehicle by means of a bracket structure which traps air impinging against the windshield underneath the storm shields. This presented no particular problem at the speeds at which vehicles traveled at the time these patents issued. However, at the greatly increased vehicle speeds of today, the use of such a storm shield would involve many problems because of the shear stresses imposed on the bracket structure due to the extreme compression of air underneath the storm shield caused by the high vehicle speeds; and, if they were extended out further from the windshield, there would also be a safety problem of air dynamic stability of the vehicle.

U.S. Pat. No. 1,479,375 to Crowell illustrates another type of device for preventing rain from impinging on an automobile windshield. In such a device, a pivotally mounted plate is turned to a position parallel to the windshield thereby creating an air vent. Such an air vent induces a flow of air upwardly along the windshield; any raindrops entering the air vent are supposedly carried upwardly in the flow of air clear of the windshield. In addition, U.S. Pat. No. 2,206,793 to Staubly and U.S. Pat. No. 2,570,399 to Smith both disclose sun visors which are adjustably movable relative to the windshield. However, the structures shown in these latter three patents are not adapted to prevent rain from impinging on the vehicle windshield regardless of the vehicle speed or rainfall quantity.

These and other such devices of the prior art will not work efficiently as a result of the varying speeds of vehicles causing the windshields to strike a greater and greater number of rain drops per second as the speed of the vehicle is increased, whereby, the rain drops will be struck by the windshield of a vehicle from a forward direction, rather than the windshield being struck by the rain drops from a downward direction as these other patents attempt to provide for. This is readily understood when looking at the disclosures of this invention in FIG 4 and the following detailed description, particularly that with respect to FIG. 4.

SUMMARY OF THE INVENTION

Accordingly, it is an object of the present invention to obviate the disadvantages of the above-noted prior art devices by providing a windshield rain deflector adapted to provide a substantially rain free, clear vision zone on the windshield coinciding with the driver's line of vision regardless of the vehicle's speed or rainfall quantity.

This and other objects of the present invention are provided by a windshield rain deflector for use on a movable vehicle having a transparent windshield through which a driver of the vehicle has a particular line of vision in operating the vehicle over a substantially longitudinal path of movement. The deflector comprises an elongated support means movably mounted on the vehicle for reciprocal movement relative thereto. The support means carries thereon a shield spaced above the driver's line of vision when in an operative position. The shield extends transversely relative to the windshield and is disposed by the support means in an operative orientation in front of the windshield; so designed to cause a greater and greater distance of open space between the shield and the windshield, relative to the increase in speed of the vehicle, for the release of air pressure. The shield or shields are angled to the path of movement of the vehicle to deflect rain away from a clear vision zone on the windshield. Actuating means are further provided for extending and retracting the support means, and thereby the shield in its operative orientation, relative to the windshield, whereby the clear vision zone may be adjusted to coincide with the driver's line of vision regardless of the vehicle speed or rainfall quantity, in accordance with the previously described mathematical relationship.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

DESCRIPTION OF A PREFERRED EMBODIMENT

Figure 1:
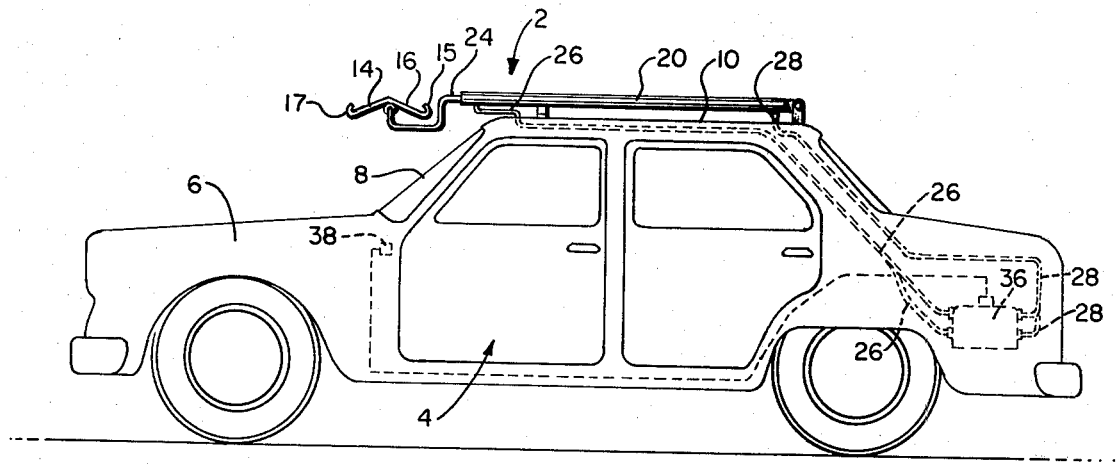
FIG. 1 is a side elevation view of a windshield deflector according to the present invention as mounted on an existing automobile.

Referring first to FIG. 1, a windshield rain deflector 2 according to the present invention is attached to a conventional automobile 4 having a body 6 including a windshield 8 and roof 10. Although deflector 2 is illustrated in conjunction with an automobile 4, it may also be used for any type of movable vehicle in which it is desired to keep a windshield surface clear, such as a truck, boat, aircraft, etc. Deflector 2 is shown herein as an accessory-type device which could be easily mounted to the roof 10 of an existing automobile 4. However, an automobile 4 could be designed so that deflector 2 comprises an integral part thereof as will be explained in more detail hereafter.

Figure 5:
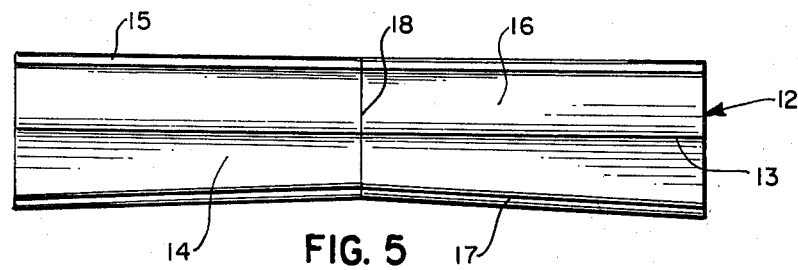
FIG. 5 is a front view of a windshield rain deflector according to the present invention.
Figure 6:
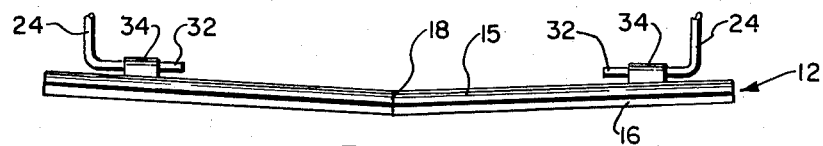
FIG. 6 is a top view of a windshield rain deflector according to the present invention.

Deflector 2 comprises a thin, substantially planar shield 12 extending transversely with respect to substantially the entire width of windshield 8. Shield 12 comprises a first planar member 14 integrally formed with or secured to a second planar member 16 along a horizontal line of attachment 13. Planar members 14 and 16 are disposed at an obtuse angle relative to one another so that shield 12 is slightly V-shaped between an upper end 15 and a lower end 17 thereof. In addition, upper end 15 and lower end 17 are reversely turned inwardly to face towards one another and form U-shaped gutters on the front surface of shield 12 for draining rain water to the sides of shield 12. Referring to FIGS. 5 and 6, shield 12 also has an angular bend at the middle thereof about a vertical line 18 so that shield 12 slopes backwardly in a slight V towards either side thereof. Moreover, lower end 17 of shield 12 may have a tapered configuration as shown in FIG. 5.

Two hydraulic cylinders 20 are fixedly mounted by suitable brackets 22 to roof 10. Brackets 22 have been illustrated herein as simple angle brackets, but may have any form or shape which is aesthetically pleasing to the eye and streamlined in terms of airflow. Cylinders 20 are double acting hydraulic cylinders having a piston (not shown) therein fixedly connected to piston rods 24 extending from the front of cylinders 20 and suitably connected to shield 12. A first hydraulic chamber supplied by a first fluid supply line 26 is disposed in front of the piston in each cylinder 20, and a second hydraulic chamber supplied by a second fluid supply line 28 is formed in the back of the piston.

Piston rods 24 extend outwardly from cylinders 20 and have U-shaped end portions 30 terminating in a transversely extending outer end 32. Two hollow cylindrical sleeves 34 are fixedly attached to the rear surface of shield 12, each sleeve 34 also being disposed transversely to pivotally receive the outer end 32 of one of piston rods 24. Shield 12 and/or rods 24 have sufficient flexibility to allow ends 32 to be inserted through sleeves 34. However, once this has been accomplished, ends 32 project far enough through sleeves 34 to allow only a limited transverse sliding movement of shield 12 without disengaging sleeves 34 from ends 32. Sleeves 34 preferably are mounted along the line of attachment between the planar members 14 and 16 and are spaced transversly apart to be adjacent the sides of shield 12.

Hydraulic cylinders 20 are suitably actuated by a direct current, reversible pump 36 located in the trunk of automobile 4. A switch 38 located on the dashboard of the automobile is manually actuated by the driver to energize pump 36 from the electrical system of automobile 4. Pump 36 is effective to shift a constant amount of hydraulic fluid charged into each cylinder 20 from one end of the cylinder to the other to effect either an extension or retraction of piston rods 24. For example, shield 12 is shown in FIG. 1 in a retracted inoperative orientation with piston rods 24 being retracted into cylinders 20 and the pistons therein located near the rear ends of cylinders 20. To cause an extension of rods 24 and shield 12, the driver merely moves the switch 38 to a first position to begin rotating reversible pump 36 in one direction. Such a rotation causes the fluid contained in the front hydraulic chamber of each cylinder to be transferred through the lines 26, through pump 36, and through the lines 28 into the rear chambers of cylinders 20. Similarly, to retract piston rods 24 and shield 12, it is only necessary to move the switch 38 to a second position causing a reverse rotation of pump 36 and a reverse flow of the hydraulic fluid from the rear chambers to the front chambers of the cylinders. Switch 38 is also provided with a third or "off" position in which pump 36 is not energized at all and shield 12 is maintained in its adjusted position.

Shield 12 is pivotally mounted to ends 32 of piston rods 24 in such a way that the shield normally lies in an inoperative orientation generally parallel to the path of movement of the automobile as shown in FIG. 1. This is achieved by longitudinally offsetting the center of mass of shield 12 slightly in back of the pivot axis for shield 12 so that the force of gravity acting on the center of mass will cause the shield to assume the position shown in FIG. 1. Shield 12 may be designed by adjusting the thickness and/or the density of planar member 16 relative to planar member 14 to ensure that planar member 16 is, in effect, "top heavy" to achieve the correct placement for the centr of mass of shield 12. Alternatively, weights may be affixed to planar member 16 adjacent upper edge 15 to achieve the same result.

Figure 2:
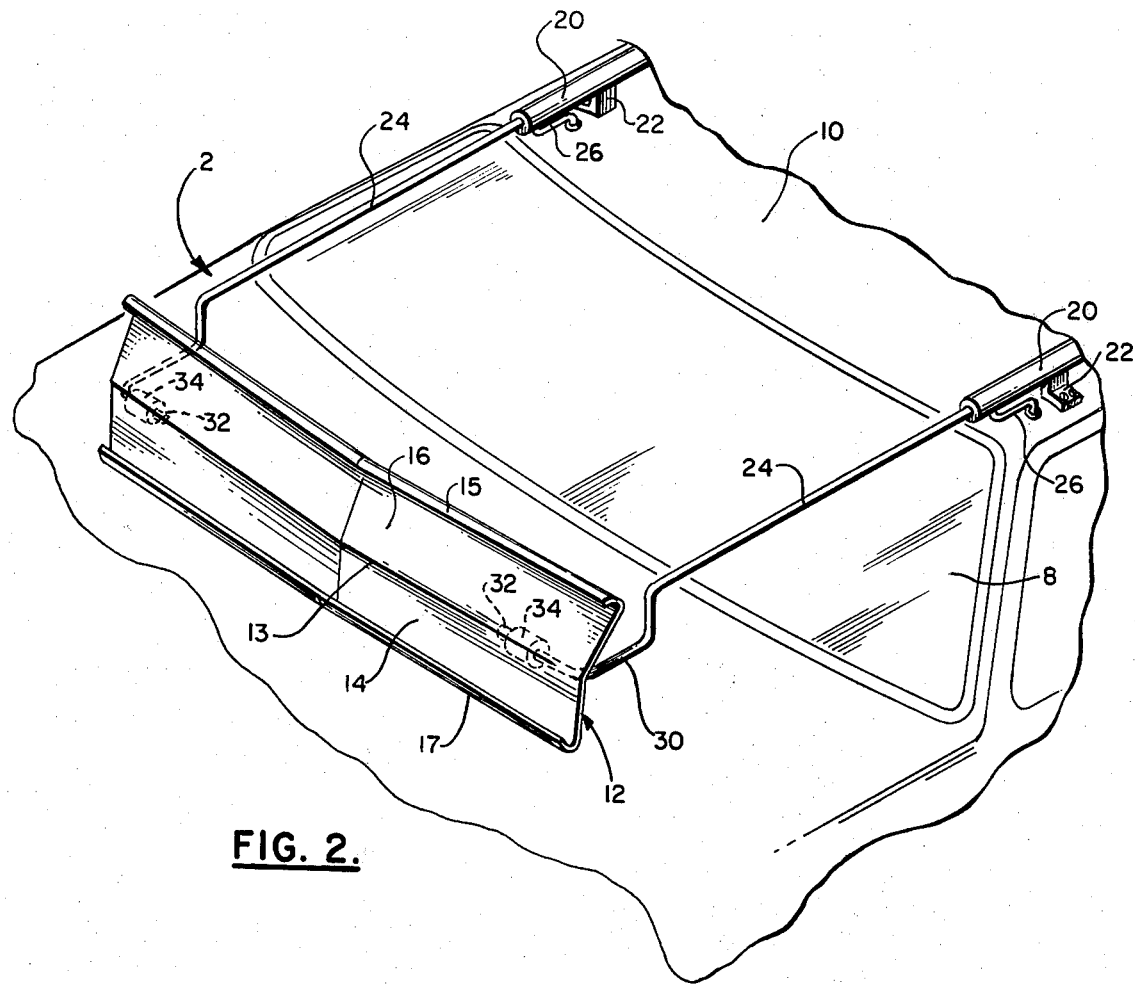
FIG. 2 is a perspective view of the windshield rain deflector of the present invention disposed in its extended operative orientation disclosing its unanticipated distance of open space between rain deflector and windshield.

When automobile 4 is traveling in a substantially longitudinal forward direction, the force of the airstream flowing therearound will act on the planar member 14, which is disposed at a slight angle relative to the airstream (FIG. 1). This force tends to flip shield 12 upwardly into an operative position generally perpendicular to the path of movement of automobile 4 (FIG. 2). However, when shield 12 is fully retracted and drawn inwardly close to windshield 8, the force of the airstream on member 14 is counterbalanced by the airstream reflected upwardly from windshield 8 and bearing against the rear surface of shield 12. As the cylinders 20 are actuated to extend the shield 12 outwardly relative to windshield 8, the counteracting force of the airstream being compressed by the windshield against the rear surface of shield 12 is lost; thus the force of the airstream on planar member 14 will automatically cause shield 12 to pivot into its operative position shown in FIGS. 2 and 4. Of much importance (shown in FIGS. 2, 4 and 7) is the distance of open space between shield 12 and windshield 8 for the relief of potential hazards of extreme air compression.

Figure 4:
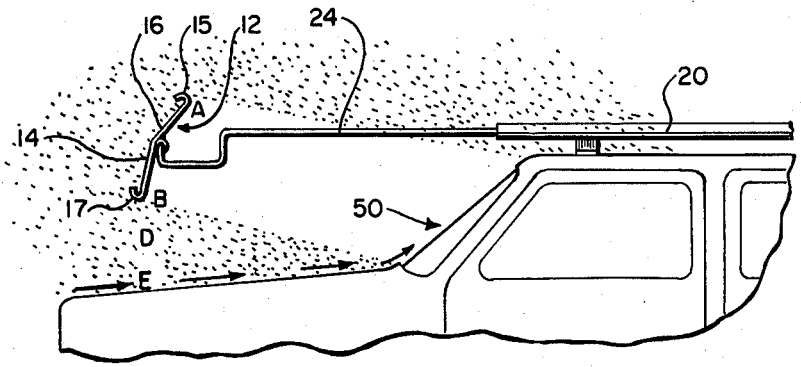
FIG. 4 is a side elevation view of a windshield rain deflector according to the present invention disposed in an extended operative orientation at 70 M.P.H., showing in detail the mathematical relationship between rain deflector, forward velocity of vehicle windshield and downward velocity of rain fall.

Referring to FIG. 4, shield 12 in its operative orientation is substantially perpendicular to the path of movement of the automobile with planar member 14 being arranged substantially perpendicular to a longitudinal path of movement of the automobile and the planar member 16 being angled backwardly relative thereto. Shield 12 will catch and deflect the rain falling downwardly to provide a clear vision zone 50 on the windshield through which the driver may see.

Such an advantageous result occurs even though the shield 12 is more perpendicular to the hood of the vehicle 4 with a sizable open space between rain shield 12 and windshield 8, (more easily seen in FIG. 2), and not horizontal and solid as one would expect would be necessary to catch the rain. The rain deflector 12 can also be in a planar position at all times, or be pivotal from planar position. However, said mathematical relationship is such that the rain deflector 12 will have to be twice as wide to give the same clear zone area as in the preferred embodiment of the invention. A mathematical explanation clarifies this result. An estimated average downward speed of rain drops is 25 ft. per second. An exact forward speed of vehicle 4 and windshield 8 is 14⅔ ft. per second at 10 M.P.H., 44 ft. per second at 30 M.P.H., 66 ft. per second at 45 M.P.H. and 102⅔ feet per second at 70 M.P.H. With these figures in mind, referring again to FIG. 4, the distance from letter A to letter B is 10 inches, from clear zone 50 to letter D is 40 inches, from letter B to letter E is 14 inches and the vehicle 4 is moving forward at 70 M.P.H. Therefore, the windshield 8 is moving forward 4 times faster than the rain drops fall downward. Whereby, the time the rain drops fall from A to B and from B to within 4 inches of E, the windshield at clear zone 50 has moved forward to D and the rain deflector 12 has moved forward 40 inches, thereby, creating a continuous clear view as is shown in FIG. 4. At this speed, without this invention there would be four times the amount of rain drops splattering on the windshield 8 than if the vehicle was stopped. With this knowledge it is now understandable why the previous prior art devices of rain deflection are inefficient at high speeds or high winds. By way of example, if a rain deflector only extended out about 1 foot above and in front of a vehicle's windshield at 70 M.P.H., there would be a maximum clear zone of 3 inches, but test results have shown in reality there would not be any completely clear zone because of four times the number of rain drops splattering when struck by the windshield. In this invention shield 12 does not itself interfere with the driver's vision since it is positioned by hydraulic cylinders 20 above the driver's line of vision. The longitudinal position of shield 12 relative to the windshield can easily be varied by the driver by operating cylinders 20 so that shield 12 always provides a clear vision zone 50 on windshield 8 regardless of the speed of the automobile and/or the quantity of the rainfall.

The faster the rain drops fall, the closer to the windshield 8 that rain shield 12 is positioned. For a clearer understanding, imagine the rain drops falling at the speed of light, then even if the vehicle was going forward at 1,000 M.P.H. the windshield 8 would never strike a rain drop, whereby, the shield 12 would have to lay parallel to hood and immediately over windshield 8 to keep rain drops from falling on windshield. Therefore, for a given speed and when automobile 4 is driving through a relatively heavy rain storm, shield 12 must be positioned closer to the front of windshield 8 than when the automobile is driving in a light rain storm. Also, for a given quantity and direction of rainfall, if automobile 4 is moving relatively fast, the shield must be positioned further in front of windshield 8 than when the automobile is moving relatively slowly. Thus, automobile speed and rainfall quantity and direction are interrelated in regard to the proper position of shield 12 with respect to windshield 8.

There are also two other factors that this invention protects against. The windshield 8 of modern vehicles is tilted backward, and therefore, the rain shield 12 is also tilted so as to more closely maintain the same mathematical distance from the top of the rain shield 12 to the top of the windshield 8, as is the distance from the bottom of rain shield 12 to the bottom area of windshield 8. Also, rain drops vary in size depending on the nature of the nuclei they contain, so that certain rain drops are larger with a greater inertia and faster falling than smaller rain drops, whereby, the tilting back of rain shield 12 will allow the lower forward section 14 and upper backward section 15 to help compensate for these different speeds of falling rain drops. The present invention provides a considerably dryer zone 50 on windshield 8 which can be adjusted to coincide with the driver's line of vision in any type of rain storm and with respect to any speed of the vehicle.

Figure 3:
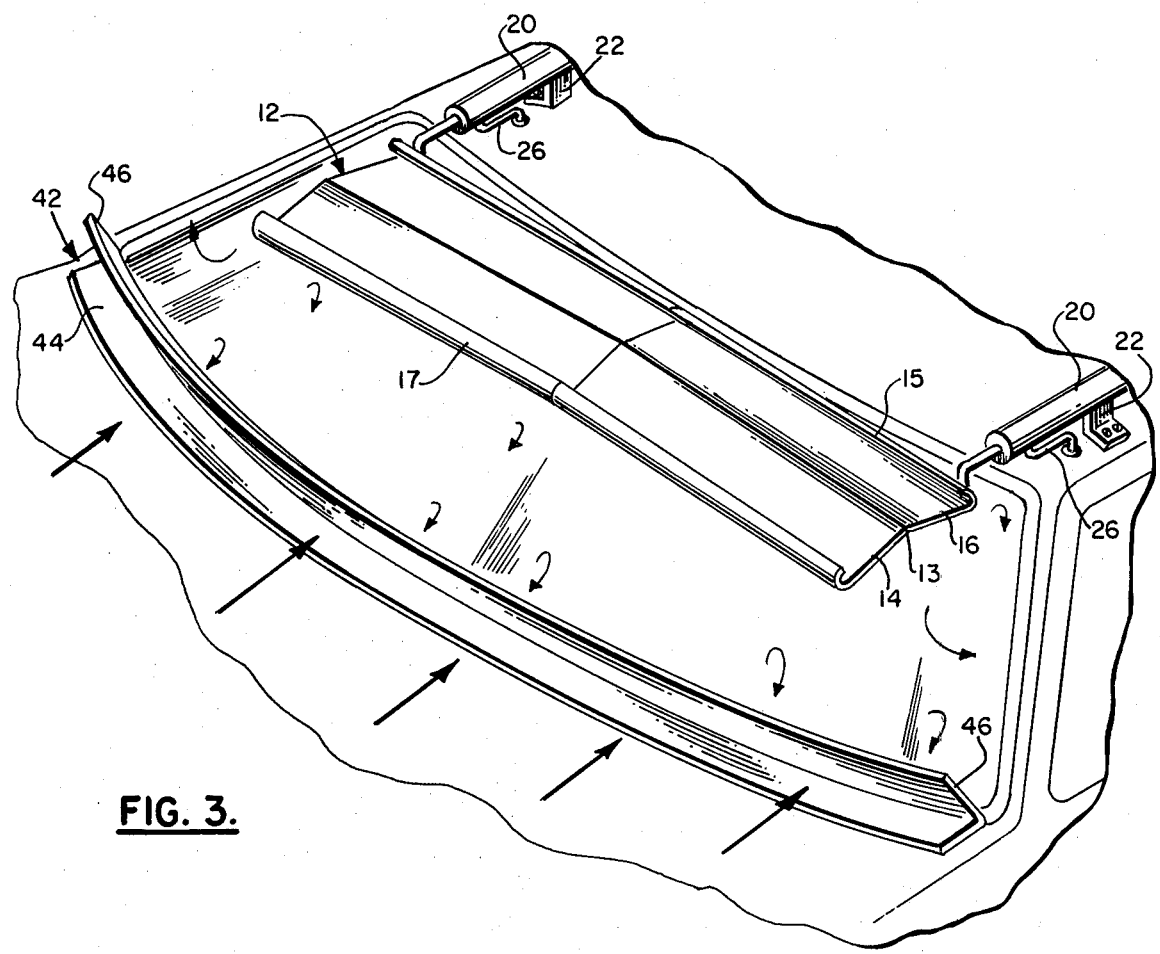
FIG. 3 is a perspective view of a windshield rain deflector according to the present invention disposed in its retracted inoperative orientation.

Referring now to FIG. 3, it has been found in tests that when shield 12 is projected in front of windshield 8, it will function to form a substantially dryer zone 50 thereon regardless of the conditions encountered. It has been observed that very fine droplets appear in the clear vision zone with shield 12 extended in its operative orientation. Such drops are believed to be spray resulting from rainfall which has first spattered on the hood and lower part of windshield of the automobile and then being deflected rearwardly and further upwardly onto windshield 8 by the airflow streaming over the automobile hood and the tilted back modern windshield. Tests have shown operation of shield 12 is enhanced by providing an air current deflector 42 mounted along the lower edge and upper edge (not shown) of windshield 8 which causes the air current to flow downward and outward over the entire windshield and to deflect away the aforementioned spray. Deflectors 42 comprises a V-shaped shield having a first side 44 lying flat in the plane of the hood of the automobile 4 and a second side 46 extending upwardly at an acute angle relative to the hood of approximately 45 degrees. Upper side 46 preferably is approximately 5 inches wide. In addition, upper side 46 may be mounted pivotally, rather than fixedly, on the hood such that it can be pivoted down into the plane of the hood when not in use. Deflector at top of windshield 8 is covered over by rain shield 12 when retracted into top of vehicle 4.

Figure 7:
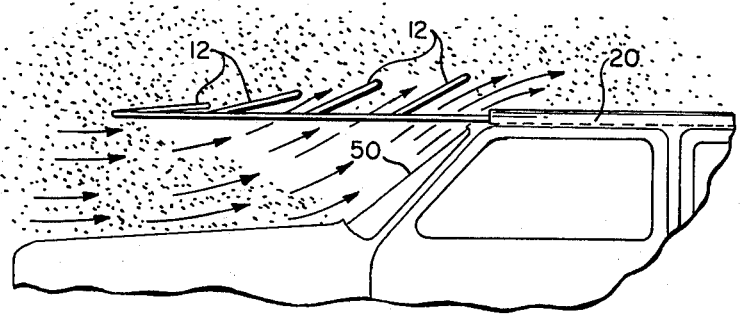
FIG. 7 is a side elevation view of another embodiment of a windshield rain deflector according to the present invention disposed in an extended operative orientation at 70 M.P.H.

Referring now to FIG. 7, there is shown another embodiment of a windshield rain deflector according to the present invention. Rain deflectors 12 are composed to lie in a planar position, but pivotal from air compression when extended in operative orientation. The compressed air beneath the rain shields and support means easily escapes through the pivotal rain deflectors 12 which eliminates stress and air dynamic stability problems. During the time when the rain deflectors 12 are pivoted up by air pressure, creating empty space between the rain shields and windshield, the same prior described mathematical relationship exists, whereby the rain drops will not fall through said open space. The advantage of this arrangement of the invention is that it is not necessary to adjust the invention when reducing speed of vehicle from fast to slow speed. The disadvantages are the weight addition, and the additional cost of manufacture and assembly.

Although cylinders 20 and shield 12 have been shown as being mounted externally on roof 10 of automobile 4 as an accessory type device which could be added to an existing automobile, cylinders 20 could be mounted inside the roof activated by the power steering pump or any other device, and shield 12 could form the front portion of the roof line when the shield is in its inoperative retracted orientation. Shield 12 is approximately ten inches wide between upper and lower edges 15 and 17, and lower edge 17 is approximately fourteen inches above the hood of automobile 4 when shield 12 is in its extended operative orientation. However, dimensions, shapes and placement for shield 12 and support means other than those described herein may be used. For example, shield 12 and cylinders 20 could be attached or made a part of the hood or lower body of automobile 4; with rods 24 having a folding arm attachment at its ends and means for raising the shield 12 above the driver's line of vision.

In addition to the hydraulic cylinders 20 previously described, various other mechanical devices, such as screw actuated pistons or solenoids, could be used to adjust the longitudinal position of shield 12. Similarly, shield 12 is effective in preventing other types of atmospheric conditions in addition to rain from impinging on the windshield including, but not limited to, snow, sleet, sun and the like. Shield 12 may be fabricated from any suitable material, such as glass, metal or plastic, and may be either opaque or transparent. In addition, shield 12 need not necessarily extend over the entire width of windshield 8, although that is preferred, but may extend only over the driver's portion of the windshield.

Although the present invention has been illustrated in terms of two preferred embodiments, it will be obvious to one of ordinary skill in the art that numerous modifications may be made without departing from the true spirit and scope of the invention which is to be limited only by the appended claims.

I claim:

1. A windshield rain deflector system for use on a vehicle movable at a significant rate of speed having a transparent windshield through which an occupant of the vehicle has a particular, forward, desired line of vision when riding in the moving vehicle, comprising:

at least one rain deflector shield defining an effective rain shielding area, which defined shielding area is movable through a series of operative dispositions each located in front of the windshield at longitudinally spaced locations from the others and located above at least most of the windshield;

support means for mounting the system on the vehicle and for carrying said shield and allowing said effective shielding area to move among its various operative dispositions, said shield(s) and said support means further defining an open, variable air pressure release area between said shield and the upper portions of the vehicle body and windshield, said air pressure release area becoming greater in size as the effective shield area is moved further forward and away from the windshield in its operative dispositions preventing extreme compression of air underneath said shield(s) as the vehicle moves forward at a significant rate of speed, the location of said effective shielding area being determined based at least in part on the forward speed of the vehicle, said movable effective shielding area and said variable air pressure release area being provided by means of a shield movable out and spaced away from the windshield by said support means, said pressure release area being defined by the ever increasing longitudinal separation space between said shield and the windshield as the shield is longitudinally moved away from and further in front of the windshield, said support means enabling movement of said shield further forward of the windshield as the speed of the vehicle is increased, said effective rain shielding area being capable of deflecting rain away from a free, clear vision zone on the windshield around the line of vision of the occupant in spite of rainy conditions and the speed of the vehicle.

2. A windshield rain deflector system according to claim 1 wherein said shield in its operative dispositions in front of the windshield is angled to the path of movement of the vehicle.

3. A windshield rain deflector system according to claim 1 wherein said shield extends transversely over substantially the entire width of the windshield.

4. A windshield rain deflector system according to claim 1, further including deflector means mounted adjacent at least one of the lower and upper edges of the windshield for preventing splattering rain drop spray from impinging on the clear vision zone of the windshield.

5. A windshield rain deflector system according to claim 1, wherein said shield further has an inoperative position adjacent the vehicle body and wherein said shield has a pivotal connection to said support means for pivotal movement between said operative dispositions and of said inoperative position.

6. A windshield rain deflector system according to claim 5, wherein said shield in said inoperative position has a first extended area portion located in front of said pivotal connection and disposed at a small angle relative to the airstream passing around said shield such that said shield is automatically rotated to a relatively large angle to the passing airstream when in said operative dispositions when the force of said airstream on said first portion exceeds a predetermined minimum as a result of said shield being extended out in front of the windshield.

7. A windshield rain deflector system according to claim 5, wherein said pivotal connection comprises at least one transversely extending hollow sleeve fixedly attached to a rear surface of said shield, and said support means comprises at least one elongated rod, said rod having a first end pivotally received within said one sleeve and a second end movably carried by the vehicle.

8. A windshield rain deflector system according to claim 1 wherein there is further included actuating means for extending and retracting said support means for selectably positioning said shield in its various operative dispositions under the control of an occupant in the vehicle as the vehicle is moving.

9. A windshield rain deflector system according to claim 8, wherein said actuating means comprises at least one fluid cylinder carried by the vehicle, and wherein said support means includes a longitudinally movable rod having a first end connected to said shield and a second end acting as a piston disposed inside said cylinder.

10. A windshield rain deflector system according to claim 1, wherein said shield comprises first and second planar members secured together along a substantially horizontal line of attachment, said first and second members terminating respectively in first and second edges and being disposed at an obtuse angle relative to one another such that said shield is slightly V or oval shaped between said first and second edges.

11. A windshield rain deflector system according to claim 10, wherein said first and second edges are reversely turned inwardly relative to a front surface of said first and second members to provide gutters for draining rain to either side of said shield.

12. A windshield rain deflector system according to claim 10, wherein said first and second members are further bent at an intermediate portion thereof to slope rearwardly to either side thereof.

13. A windshield rain deflector system for use on a vehicle movable at a significant rate of speed having a transparent windshield through which an occupant of the vehicle has a particular, forward, desired line of vision when riding in the moving vehicle, comprising:
at least one longitudinally movable rain deflector shield movable through a series of longitudinally spaced, operative rain deflecting positions each located in front of the windshield and at least in part above the forward line of vision;
longitudinally extendable support means for movable mounting and carrying the shield on the vehicle;
actuating means for extending and retracting said support means under the control of a vehicle occupant for selectably positioning said shield in its various operative positions based at least in part on the speed of the moving vehicle, said shield in its operative rain deflecting positions beng disposed and extended laterally as well as vertically across the direction of travel of the vehicle, the forward position and lateral and vertical extensions of said shield producing a free, clear vision zone on the windshield around the forward line of vision of the occupant in spite of rainy conditions, there being a substantial open, separation space between said shield in its operative rain deflecting positions and the windshield.

14. The system of claim 13 wherein said support means includes at least one longitudinally movable rod extending out in the longitudinal direction from the vehicle.

15. The inventions of any one of claims 1 or 13, wherein the shield is positionable out from the forward of the windshield of the order of forty inches.

16. The method of deflecting rain from the windshield of a moving vehicle which windshield has a viewing area through which the occupant of the vehicle generally looks to see what is ahead of the vehicle, comprising the steps of:
providing and longitudinally positioning a rain shield out in front of the vehicle at a position above the windshield and longitudinally extending it to a position substantially out in front of and substantially spaced from the windshield sufficient to physically block the rain from impinging on said viewing area, with the forward-most extension of the shield being proportionately determined at least in part with regard to the operating speed of the vehicle with the greater the operating speed, the greater the forward-most position of the shield.

17. The method of claim 16 wherein said shield is movably mounted on the vehicle for movement with respect to the vehicle along the direction of travel of the vehicle, and wherein there is further included the step of positioning the body of the shield with respect to the vehicle out from and forward of the windshield based on vehicle speed and rainfall quantity and direction.

18. The method of claim 17 wherein said shield is supported by at least one horizontally disposed rod moving like a piston in a cylinder and said shield is moved by the step of applying fluid pressure to the piston on the side appropriate to the direction of desired movement.

19. The method of claim 17 wherein there is included the step of providing an ever increasing open area behind said shield as said shield is moved further away from the windshield.

* * * * *